US 7,676,573 B2

(12) United States Patent
Herzog et al.

(10) Patent No.: US 7,676,573 B2
(45) Date of Patent: Mar. 9, 2010

(54) NODE MONITOR CLIENT CACHE SYNCHRONIZATION FOR MOBILE DEVICE MANAGEMENT

(75) Inventors: Shai Herzog, Bellevue, WA (US); Marie Hagman, Seattle, WA (US); Eric S. Vandenberg, Seattle, WA (US); Michael E. Deem, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 208 days.

(21) Appl. No.: 12/028,102

(22) Filed: Feb. 8, 2008

(65) Prior Publication Data

US 2009/0204701 A1 Aug. 13, 2009

(51) Int. Cl.
*G06F 15/173* (2006.01)
(52) U.S. Cl. ........................ 709/224; 709/223
(58) Field of Classification Search ................ 709/223, 709/224, 203; 707/200; 715/709
See application file for complete search history.

(56) References Cited

U.S. PATENT DOCUMENTS

| 2002/0111996 A1* | 8/2002 | Jones et al. .................. 709/203 |
| 2005/0055397 A1 | 3/2005 | Zhu et al. |
| 2005/0060361 A1 | 3/2005 | Chyatrath et al. |
| 2005/0228847 A1 | 10/2005 | Hayes, Jr. |
| 2006/0200658 A1 | 9/2006 | Penkethman |
| 2006/0200814 A1 | 9/2006 | Kontinen et al. |
| 2007/0078978 A1* | 4/2007 | Arnold et al. ............... 709/224 |
| 2007/0083813 A1* | 4/2007 | Lui et al. .................... 715/709 |
| 2007/0093243 A1 | 4/2007 | Kapadekar et al. |
| 2007/0162577 A1* | 7/2007 | Schow et al. ............... 709/223 |
| 2007/0169093 A1 | 7/2007 | Logan et al. |
| 2007/0192373 A1* | 8/2007 | Lomet ........................ 707/200 |
| 2007/0207800 A1 | 9/2007 | Daley et al. |
| 2008/0082652 A1* | 4/2008 | Gates et al. ................. 709/224 |

FOREIGN PATENT DOCUMENTS

WO WO2007014630 A1 8/2007

OTHER PUBLICATIONS

An introduction to OMA Device Management (8 pgs.), Oct. 31, 2006. http://www-128.ibm.com/developerworks/wireless/library/wi-oma/.
HP Enterprise Mobility Suite (2 pgs.), May 2007. http://h71028.www7.hp.com/enterprise/downloads/DatasheetEnterpriseMobilitySuite053107.pdf.
Managing Windows Mobile Powered Devices (2 pgs.), Aug. 17, 2007. http://msdn2.microsoft.com/en-us/library/bb737404.aspx.

* cited by examiner

*Primary Examiner*—Le Luu
(74) *Attorney, Agent, or Firm*—Merchant & Gould

(57) ABSTRACT

A stateful cache layer is created at a mobile device client that tracks the state on both the mobile device and management service. The states are synchronized between the mobile device and the management service on every management session. Through the statefulness of the cache layer, unauthorized changes on the mobile device are detected and accordingly handled such as internal correction or reporting to the management service for actionable instructions. A cache layer on the management server is configured to identify organizational policy changes that affect specific devices and initiate unsolicited immediate management sessions to update the configuration to the specific devices.

20 Claims, 7 Drawing Sheets

NODE MONITOR CLIENT CACHE SYNCHRONIZATION FOR MOBILE DEVICE MANAGEMENT

BACKGROUND

A mobile device managed by an organization is typically configured and controlled by a management service to ensure compliance. The mobile device may connect periodically over the air to the management service and send/receive management related information during a management session such as send status, send inventory, receive configuration, or receive policy.

In a conventional system, where the mobile device and the management service may not be aware of the other one's state, same information may be transmitted periodically between the two entities. This may result in excessive traffic, since duplicate information is sent repeatedly. While some powerful devices such as PCs may not be disadvantaged by the excessive traffic, for mobile devices with relatively limited connectivity, bandwidth, and/or battery life this approach may have severe implications due to the device limitations and degrade overall user experience as well as increase total cost of ownership (e.g. cause lag time while performing a management session).

Moreover, the lack of awareness of the mobile device's state by the management service results in lack of trust the management service has in the mobile device that it is correctly configured at any given time. If an on-device configuration or policy changes, that change may not be detected until the next management session, which can take place a long time after the actual change occurs on the device. Similarly, the management service may be unable to determine if an organizational configuration or policy change actually affects a specific device.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to management of mobile devices through a stateful cache layer created at the mobile device client that tracks a state on both the mobile device and a management service. The states may be synchronized between the mobile device and the management service periodically. Through the stateful cache layer, changes on the mobile device may be detected and accordingly handled such as ignoring the change, internal correction, or reporting to the management service for actionable instructions. According to some embodiments, another cache layer on the management server may be configured to identify organizational policy changes that affect specific devices and initiate unsolicited immediate management sessions to update the configuration to those devices.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly discussed above, states between a mobile device and a management service may be synchronized employing a stateful cache layer enabling the management service to be aware of mobile device configuration at all times and determine mobile devices to which policy changes are applicable. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Figure 1:
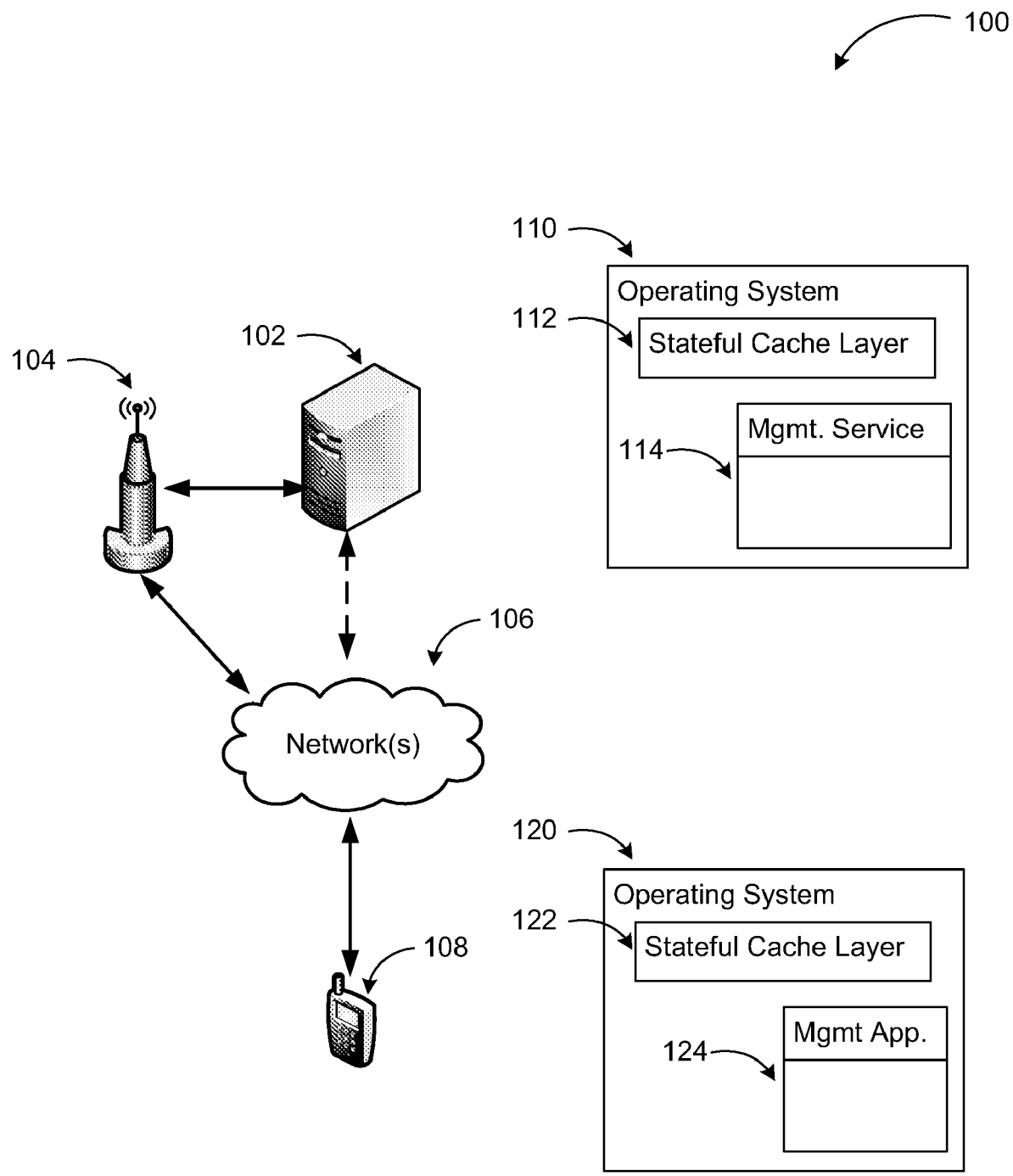
FIG. 1 is a conceptual diagram illustrating an example mobile device and its management service, where embodiments may be implemented.

Referring to FIG. 1, diagram 100 of an example mobile device and its management service according to embodiments is illustrated. With the proliferation of networked mobile devices and service providers, management of these devices such as their configuration, network compatibility, permitted service features, and so on, has become a challenging aspect. A number of standardization attempts have resulted in specifications like Open Mobile Alliance Device Management (OMA DM) specification, which is designed for management of small mobile devices such as mobile phones, PDAs and palm top computers. The device management according to this and other specifications supports typical uses like: configuration of the device (allowing changes to settings and parameters of the device); provisioning (configuration of the device—including first time use—enabling/disabling features); software upgrades (providing for new software and/or bug fixes to be loaded onto the device, including applications and system software); and fault management (reporting errors from the device, querying about status of device).

Some standard mobile device management systems use structured mark-up language based communication for data exchange such as Extended Mark-up Language (XML) or a subset of the XML (e.g. SyncML). The device management takes place by communication between a server of the management service such as a service provider and a client (the mobile device itself or an application on the mobile device). It should be noted that modern mobile devices are capable of supporting multiple modes of communication and multiple identities. Thus, a single physical device may accommodate multiple clients (one for each different communication network). On the other hand, a single client can also accommodate communication over multiple networks.

A mobile device management system may support and utilize any number of data transports such as physically over both wired and/or wireless media and transport layers implemented over any network communication protocol (e.g. WAP, HTTP). The communication protocol is typically a request-response protocol. Authentication and challenge of authentication may be built-in to ensure that the server and the client communicate only after proper validation.

In a standardized management system such as one compliant with OMA DM, the communication is initiated by the client. The communication may be initiated at a regularly scheduled time, or in response to an internal event such as completion of downloading an application, or the device receiving an alert from the management server. Once the communication is established between the server and the client, a sequence of messages may be exchanged to complete a given device management task. The OMA DM protocol specifies exchange of packages during a session, each package consisting of several messages and each message consisting of one or more commands. The server initiates the commands and the client is expected to execute the commands and return the result via a reply message. According to an OMA implementation, at least the client initiates the OMA session with an initial request message.

Mobile devices managed by a system according to embodiments may communicate over a variety of networks. Such networks may include those known as cellular networks (e.g. GSM, CDMA), local or wide area networks (LAN, WAN), or the newer Unified Communication Networks (UCN), which integrate multiple communication systems (for example the Office Communication System® by MICROSOFT CORP. of Redmond, Wash.).

In the conceptual diagram 100 of FIG. 1, mobile device 108 is shown as communicating (and being managed by) server 102 of a management service over networks(s) 106. Network(s) 106 may include one or more of the above mentioned networks or others. Server 102 may communicate with mobile device 108 through a transceiver 104 (such as cell tower, access point, etc.) or directly.

In a system according to embodiments, a stateful cache layer 122 is provided within the operating system 120 of the mobile device (or client on the mobile device). The operating system may also include a management application 124 for performing tasks associated with management of the device such as configuration, fault management, error tracking, etc. Stateful cache layer 122 on the mobile device is configured to track the actual state on both device and management service and synchronize between the two periodically (e.g. on every management session). Given its statefulness, cache layer 122 can also identify changes on the device and act accordingly (either correcting them internally, or initiating a management session to the server 102 to report those changes and get actionable instructions).

On server 102, a corresponding stateful cache layer 112 is provided within operating system 110 according to other embodiments. Server 102 may also execute management service 114 for managing mobile device 108 and others. The stateful cache layer 112 on server 102 can identify organizational policy changes that affect specific devices and as a result initiate an alert to force devices to connect for an immediate management session with the server to send the fresh configuration to the mobile device. Through this synchronization mechanism between the mobile device client and a device management server the mobile device is ensured to be compliant with management directives at all times while reducing management session overhead (configuration information etc. do not have to be repeatedly transmitted on every single management session) on bandwidth, memory, and mobile device processing.

Furthermore, the stateful nature of the synchronization mechanism allows the management service to detect if certain devices are non-compliant with management policy and as a result block their ability to connect to the organization's network (or to other devices) until remediation takes place.

Figure 2:
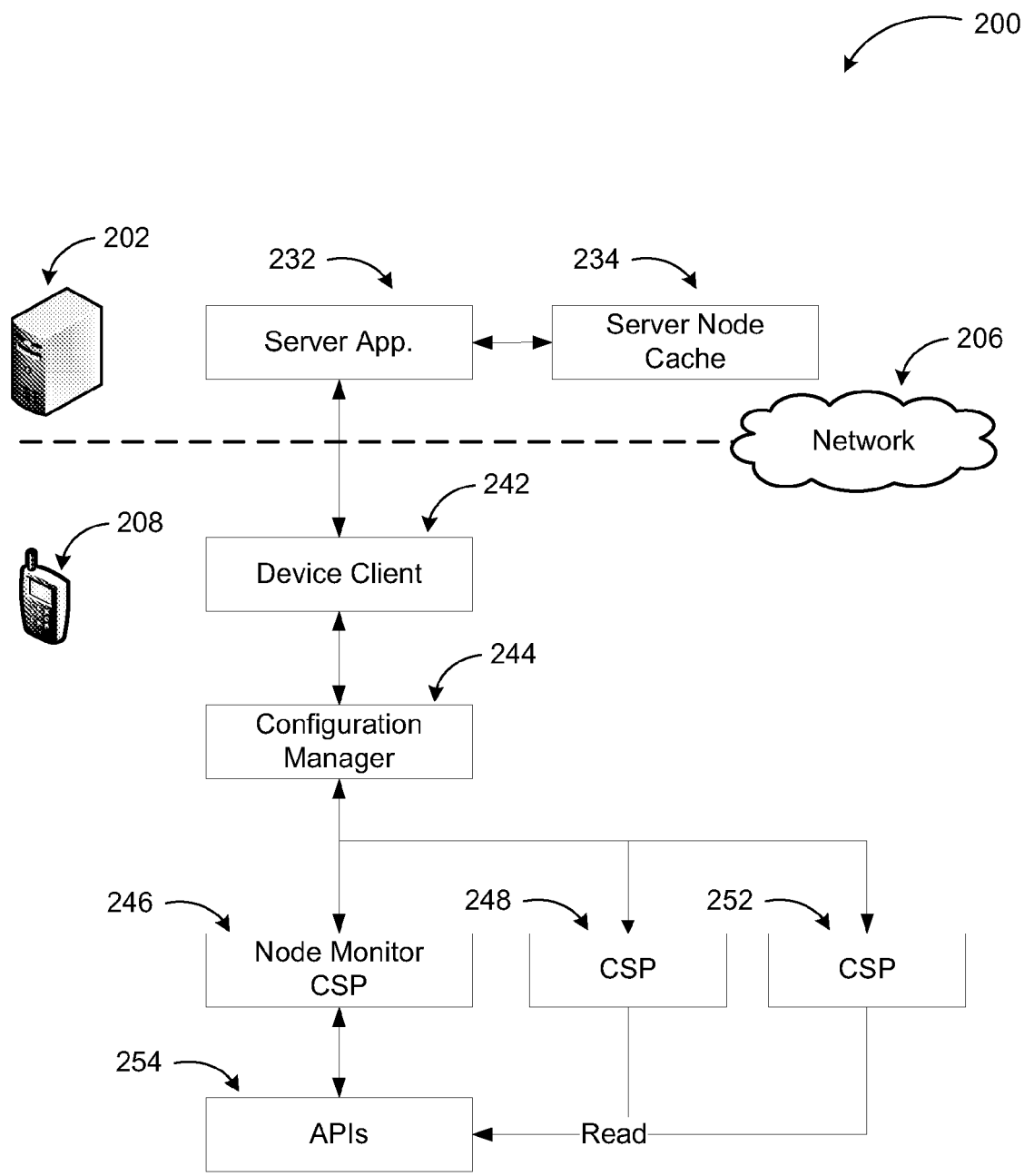
FIG. 2 illustrates relevant components of an example architecture of a mobile device management system.

FIG. 2 illustrates relevant components of an example architecture of a mobile device management system. In diagram 200, main components of management service on the server side (202), on the mobile device side (208), and their interaction is illustrated. A system according to embodiments is not limited to the described components, however, and may be implemented with fewer or additional components and interactions using the principles described herein.

When mobile device 208 connects to the device management server 202 for the first time through network 206, server application 232 on server 202 communicates a list of Uniform Resource Identifiers (URIs) that indentify nodes to mobile device cache layer through device management client 242. Server application 232 may also communicate a priority of change status notification for each of the cached URIs. If a URI is marked as "critical" or "immediate" for example, the mobile device must notify the server when it detects a change in the value. Configuration Service Provider (CSP), a handler that is registered for managing operations on designated subset of OMA nodes, may be used to handle the nodes.

During device management sessions, server application 232 receives ("gets") values from the mobile device to populate the server node cache 234. On the mobile device 208, a node monitor CSP 246 may track changes across the list of CSP URIs (or nodes) provided by the server (e.g. CSP 248, CSP 252). The node monitor CSP 246 provides a level of abstraction that decouples managing the node list from a specific back-up store. The mobile device 208 may initiate a management session with the server 202, when the node monitor CSP 246 on the device management client 242 detects a change in value for a cached node. The frequency of synchronization may be directed by the criticality of a change on the mobile device. If a URI marked as "critical" changes, the node monitor CSP 246 on the mobile device may immediately create a session with the server application 232. If a non-critical URI changes, the session with the server application 232 may be scheduled for a low use time such as late night to avoid impacting the end user experience.

Configuration manager 244 may check the access permission to find whether an action is permitted for designated objects by the device management server, identify which CSP should be called, route the command to the specific CSP, and send a result from the CSP back to the server application 232 through device management client 242.

Node monitor CSP 246 communicates to the server application 232 a list of URIs that have changed in value since the last session with the server. This invalidates the values for those URIs on the server side. The server may retrieve those values from the client as needed for management activity. When a management update is created on the back end, the management server may determine if it must change configuration on a mobile device based on the server side cache values. The server may use a mechanism to alert the mobile device to start a management session with the server to get the configuration updates it needs.

Since server 202 has a relatively up-to-date representation of the mobile device URI values, the system can immediately determine which mobile devices are non-compliant and must be blocked (quarantined) or alerted to have an immediate management session when new back-end management policies are implemented. This optimization reduces potential load on the server because devices that are already compliant are not usurping server resources to have a session when not needed.

Figure 3:
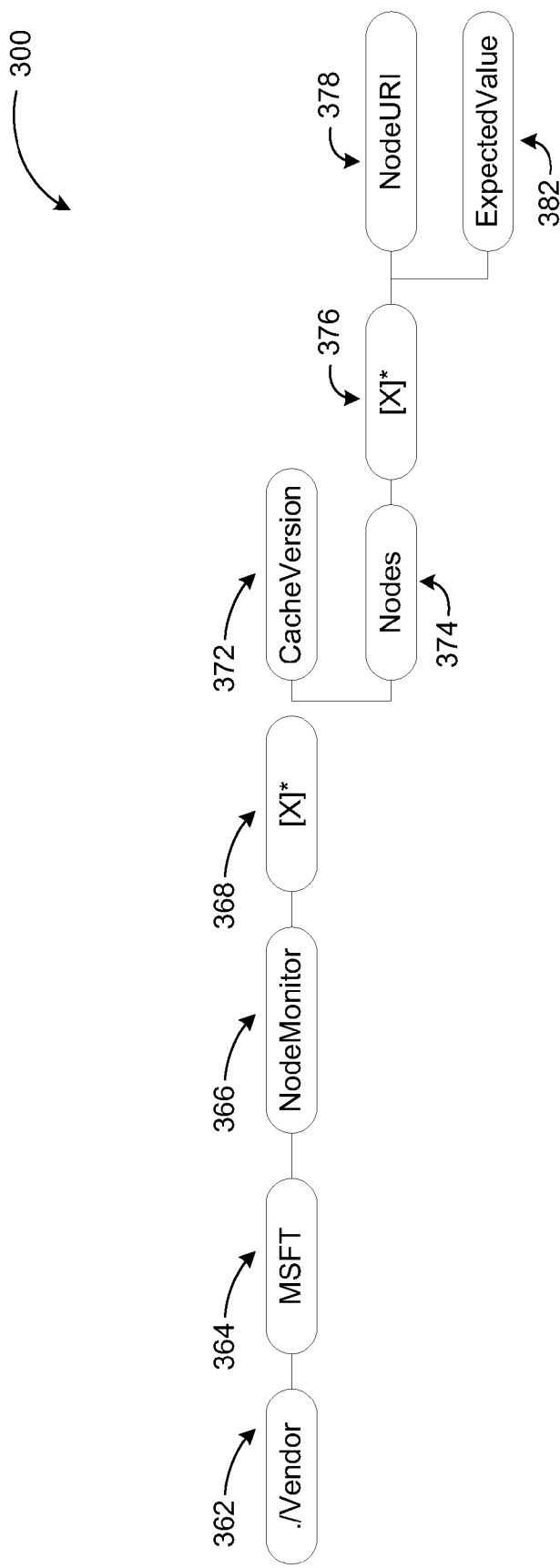
FIG. 3 illustrates example parameters exchanged in a synchronization session according to embodiments.

FIG. 3 illustrates example parameters (nodes) exchanged in a synchronization session according to embodiments. As shown in diagram 300, ./Vendor/MSFT/NodeMonitor (362, 364, 366) specify the root node for NodeMonitor, which is used by the management server to synchronize stateful client cache with the server-side cache and which provides a level of abstraction that decouples managing the node list from a specific back end store.

./Vendor/MSFT/NodeMonitor/[x] (362, 364, 366, 368) provide the identity of the device management server account as registered with the client during the enrollment process to the management service. CacheVersion 372 is a parameter set by the device management server when the set of nodes or their expected values changes. This parameter is sent by the client CSP in the alert message used to initiate a management session. Nodes 374 identify as ./Vendor/MSFT/NodeMonitor/[x]/Nodes the root node for cached nodes.

./Vendor/MSFT/NodeMonitor/[x]/Nodes/[x] (376) identifies a node named [x] as specified by the server for storing information about each node. NodeURI 378 includes a complete device management node URI. The URI may specify either an interior or leaf node. Finally, ExpectedValue 382 includes a value for the node that the server expects to be on the device. When the CSP initiates a management session, it checks the expected value against the node's actual value.

Figure 4:
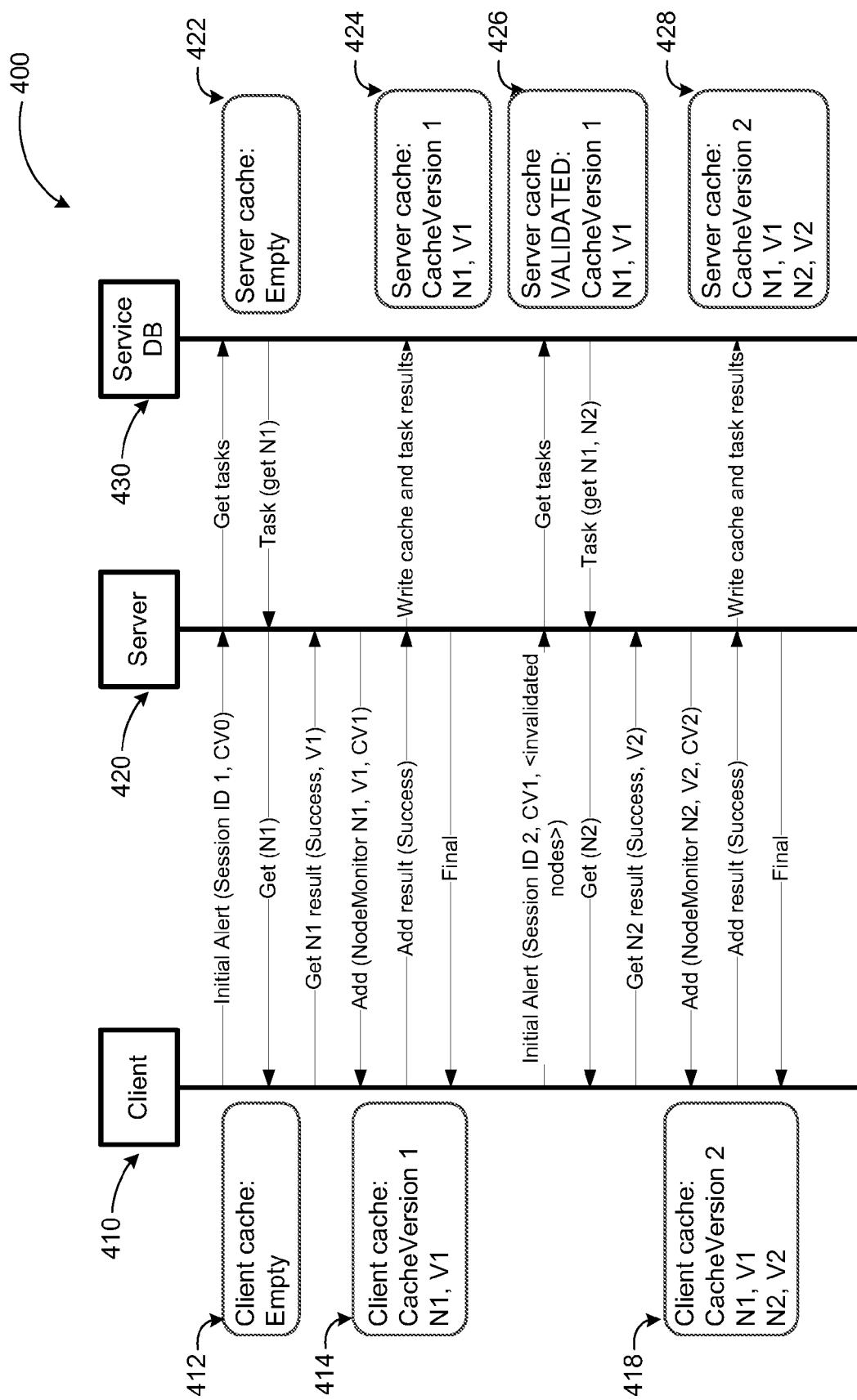
FIG. 4 is an action flow diagram illustrating example actions in a synchronization session between a mobile device and the management service using client and server cache layers.

FIG. 4 is an action flow diagram 400 illustrating example actions in a synchronization session between a mobile device and the management service using client and server cache layers. The example actions illustrate a task with "Get" command on CSP node N1 and follow on session with Get command on CSP node 2. In general, a management session has many other operations such as Get, Set, Delete, etc.

The client 410 and server 420 both start with an empty cache (412 and 422). The client sends an initial alert for the first management session (Session ID 1) with the server and provides and initial cache version, which according to this example is an invalid version (CV0).

The management session, which may be facilitated using a mark-up language protocol, proceeds normally after this point. Tasks are queued from the management service database 430 and executed. Once all tasks have been executed the client cache is configured via the new NodeMonitor CSP (N1). When the server 420 receives a "success" message from the client 410, the server writes the server side cache such that it is identical to the clients (414 and 424). The results from all the tasks and caches (e.g. cache version CV1) are also written to the management service database 430 at this point. The final message is sent to the client closing the management session (Session ID 1).

On the next management session (Session ID 2), client 410 sends an initial alert with the valid cache version (CV1) and nodes that are invalidated on the client as a result to changes in that URI value. Server 420 then marks those nodes as invalid and if any tasks need the correct value, the server gets them from the client (426). Server 420 retrieves from client 410 any values not marked as valid in the server-side cache (e.g. N2). After all tasks have been executed, server 420 again writes to the client cache (418) and updates the server cache (428) in the management service database 430.

While the example systems in FIGS. 1, 2, and 3 have been described with specific components, embodiments are not limited to these components, interactions between the components, or system configurations and may be implemented with other system configuration employing fewer or additional components. Functionality of the systems enabling mobile device management through stateful cache synchronization may also be distributed among the components of the systems differently depending on component capabilities and system configurations.

Figure 5:
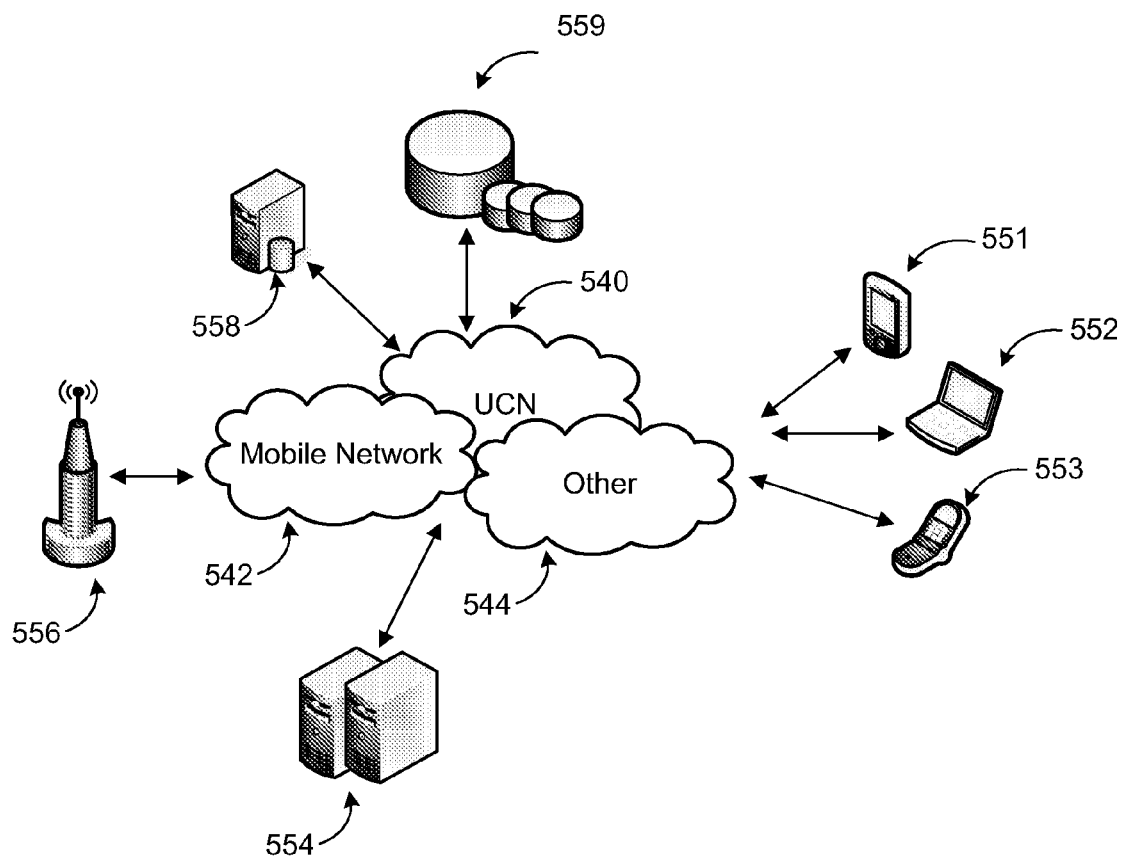
FIG. 5 illustrates a networked environment where embodiments may be implemented.

FIG. 5 is an example networked environment, where embodiments may be implemented. A mobile device management system such as those described previously may be implemented locally or in a distributed manner over a number of physical and virtual clients and servers. Such a system may typically involve one or more networks of the same type or distinct such as UCN 540, Mobile Network 542, and Other 544. The system may be implemented in un-clustered systems or clustered systems employing a number of nodes communicating over one or more networks.

A system according to embodiments may comprise any topology of servers, clients, Internet service providers, and communication media. Also, the system may have a static or dynamic topology. The term "client" may refer to a client application or a client device (e.g. mobile device). While mobile device management system employing stateful cache layer synchronization may involve many more components, typical and relevant ones are discussed in conjunction with this figure.

Mobile devices 551 through 553 may participate in a managed system over one or more of the networks 540, 542, and 544 and be managed by management server(s) 554. While example mobile devices such as smart phones, PDAs, laptop or handheld computers, etc., have been used as illustrative examples, embodiments are not limited to those. As mentioned previously, mobile communication may be implemented in purely software form as well, such as a client application that can be executed on any computing device. Since such a client application may be installed and executed on other types of computing devices such as a smart automobile console or even a desktop computer, embodiments may be implemented in those devices and others using the principles described herein. Data associated with the system and mobile device configuration may be stored in one or more data stores such as data stores 559, which may be directly accessed by the servers and/or clients of the system or managed through a database server 558. The system may also employ additional servers for performing other specific tasks employing a number of protocols such as SIP, RTP, and the like. Mobile devices 551-553 provide platforms for client applications. Thus, users may access one or more communication systems using a client device or one or more client applications running on a client device.

Networks 540, 542, 544 may include a secure network such as an enterprise network or a cellular network, an unsecure network such as a wireless open network, or the Internet. Networks 540, 542, 544 provide communication between the nodes described herein. By way of example, and not limitation, Networks 540, 542, 544 may include wired media such as a wired network or direct-wired connection, and wireless media such as acoustic, RF, infrared and other wireless media.

Many other configurations of computing devices, applications, data sources, data distribution systems may be employed to implement stateful cache synchronization for mobile device management. Furthermore, the networked environments discussed in FIG. 5 are for illustration purposes only. Embodiments are not limited to the example applications, modules, or processes.

Figure 6:
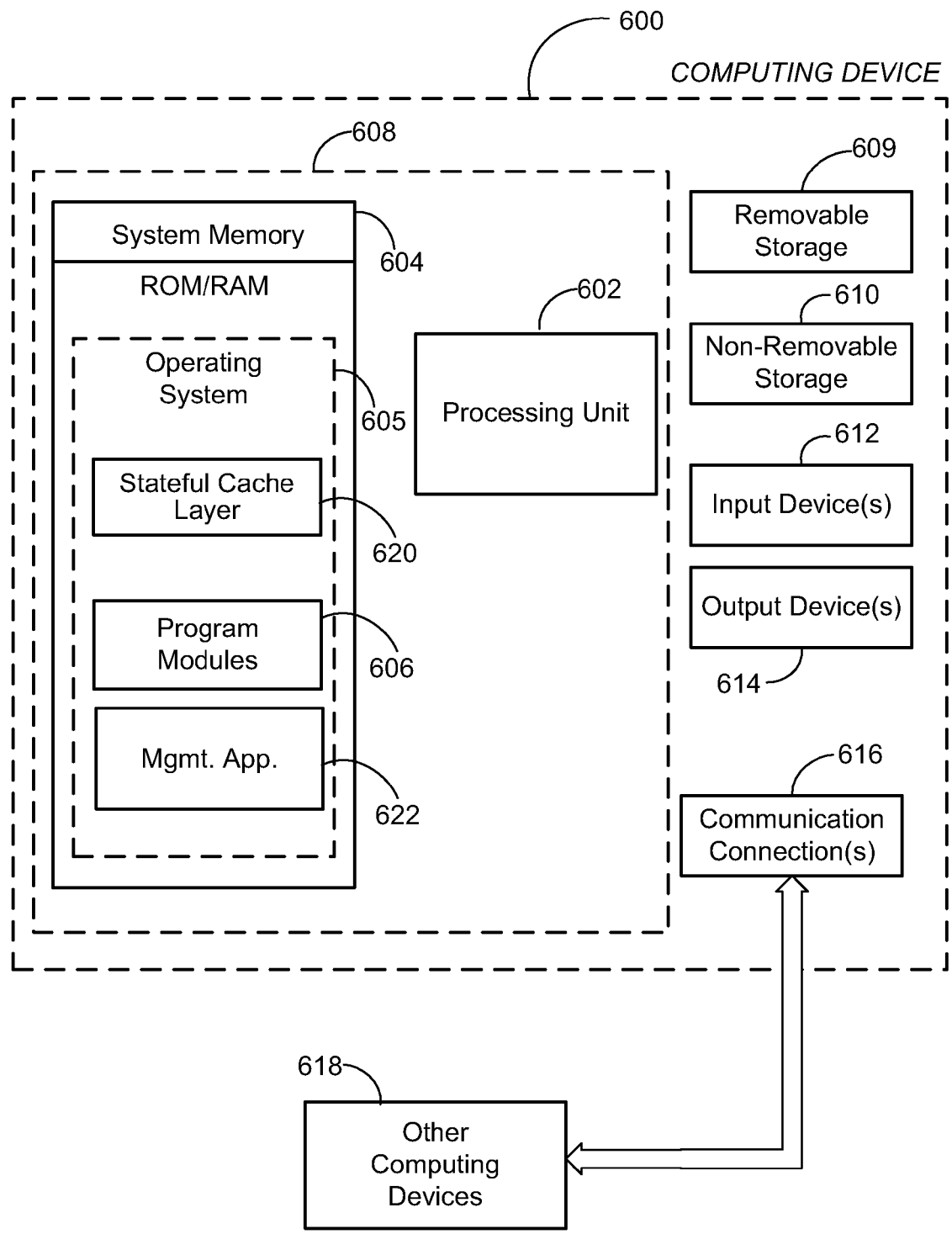
FIG. 6 is a block diagram of an example computing operating environment, where embodiments may be implemented.
Figure 7:
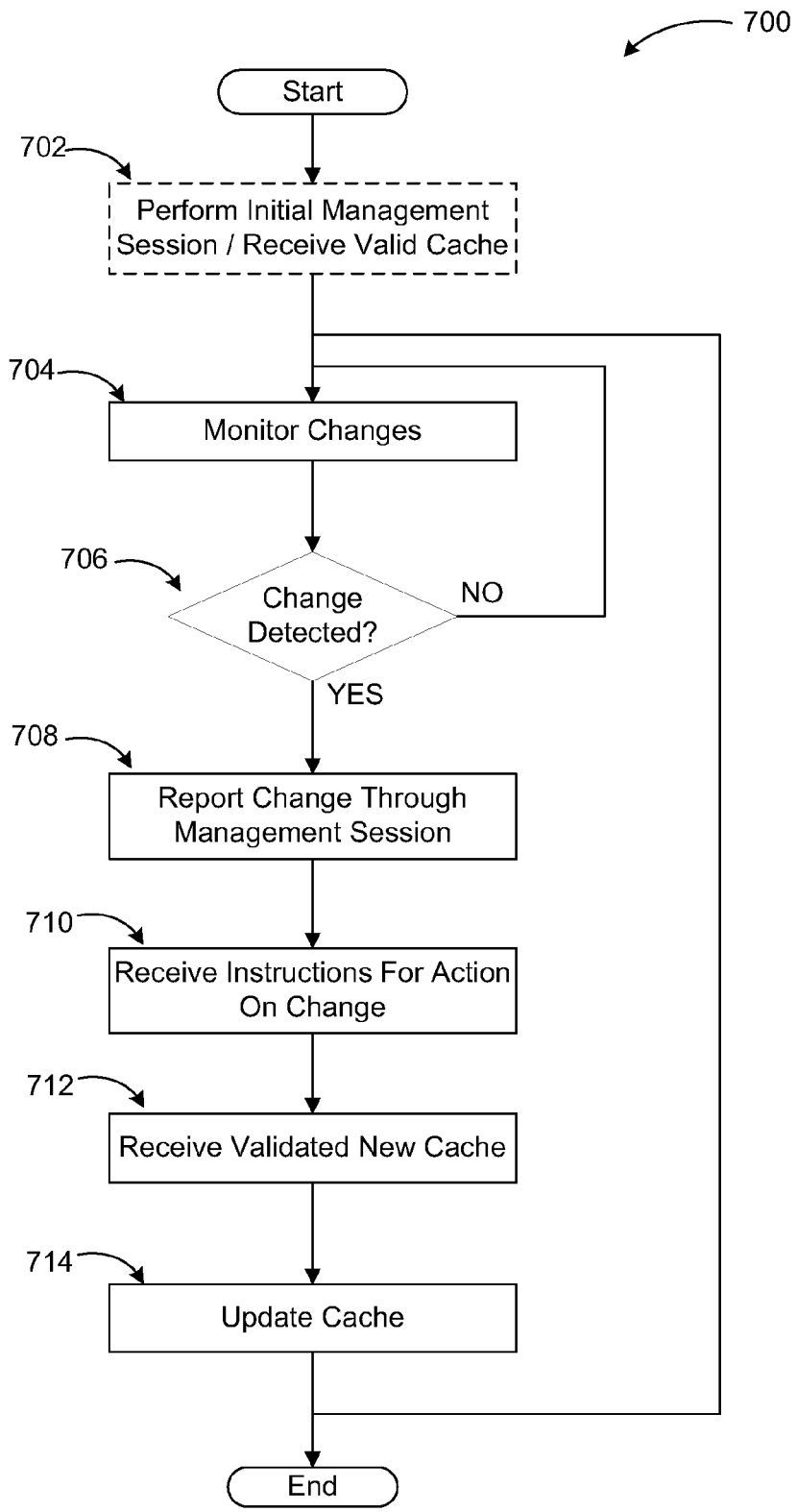
FIG. 7 illustrates a logic flow diagram for a process of using a cache layer in synchronizing mobile devices according to embodiments.

FIG. 6 and the associated discussion are intended to provide a brief, general description of a suitable computing environment in which embodiments may be implemented. With reference to FIG. 6, a block diagram of an example computing operating environment is illustrated, such as computing device 600. In a basic configuration, the computing device 600 may be a mobile device executing a client application for communicating through a managed network. Computing device 600 may typically include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the computing device, such as a version of the WINDOWS® operating systems from MICROSOFT CORPORATION of Redmond, Wash. The system memory 604 may also include one or more software applications such as program modules 606 and device management application 622. A computing device according to embodiments also includes a stateful cache layer 620 within its operating system.

Device management application 622 may be a separate application or an integral module of a management service executed remotely at a management server. Furthermore, the management tasks described herein may also be performed by the operating system itself. As discussed above, states of the management server and client are synchronized using the stateful cache layer 620 ensuring compliance of the computing device 600 with management policies at all times, reducing a burden of management sessions for repeated state updates and synchronizations, and enabling the management service to detect and take action on unauthorized configuration changes to computing device 600. This basic configuration is illustrated in FIG. 6 by those components within dashed line 608.

The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer storage media may include volatile and non-volatile, removable and non-removable media implemented in any method or technology for storage of information, such as computer readable instructions, data structures, program modules, or other data. System memory 604, removable storage 609 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of device 600. Computing device 600 may also have input device(s) 612 such as keyboard, mouse, pen, voice input device, touch input device, etc. Output device(s) 614 such as a display, speakers, printer, etc. may also be included. These devices are well known in the art and need not be discussed at length here.

The computing device 600 may also contain communication connections 616 that allow the device to communicate with other computing devices 618, such as over a wireless network in a distributed computing environment, for example, an intranet or the Internet. Other computing devices 618 may include client devices of the managed network or a management server as discussed above. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

FIG. 8 illustrates a logic flow diagram for process 700 of using a stateful cache layer in synchronizing mobile devices according to embodiments. Process 700 may be implemented in a client application executed in a mobile device capable of communicating over a managed network.

Process 700 begins with optional operation 702, where mobile device performs an initial management session with the management service and receives valid parameters for its stateful cache layer defining its configuration, features, permissions, etc. According to some embodiments, the cache may be configured during manufacturing and an initial management session may not be necessary. Processing advances from optional operation 702 to operation 704.

At operation 704, the mobile device monitors any changes in its configuration during normal operations. If a change is made that is not authorized by the management service, the mobile device cache is modified to reflect that change allowing the change to be detected by the system. Processing moves from operation 704 to decision operation 706, where a determination is made whether an unauthorized change is detected. As discussed previously, CSPs may be defined by the management service with specific priority levels such as critical, normal, etc. The reaction to the change may depend on the management service defined priority attribute of the particular CSP (node). If no change is determined at decision operation 706, processing return to operation 704 for continued monitoring of changes. If a change is detected, processing advances to operation 708.

At operation 708, the change is reported to the management service through a management session with the management server, which also includes a stateful cache layer according to embodiments reflecting the previous configuration of the mobile device. The report may be in form of an immediate management session if the particular node is a high priority one, or scheduled for a low traffic time if the node is low priority. On the server side, a decision is made as to what action should be taken in response to the change. If the change is severe, the mobile device may be instructed to block itself from further functional operations. Processing moves from operation 708 to operation 710.

At operation 710, instructions are received from the server on how to deal with the change. These are actionable commands for the mobile device and may include quarantining of the mobile device. Processing proceeds to operation 712 from operation 710.

At operation 712, the mobile device receives validated and updated information for storing in its cache upon completing the instructions provided at operation 710 and reporting successful completion. The received information also reflects the updated stateful cache at the management server. Processing advances from operation 712 to operation 714.

At operation 714, the mobile device cache is updated with the new state and processing returns to operation 704 for further monitoring of changes in the mobile device.

The operations included in process 700 are for illustration purposes. Using stateful cache layer synchronization for mobile device management may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for managing a mobile client in a network environment, the method comprising:
   storing a first information associated with a mobile client state at the mobile client, wherein the first information is identical to a stored second information at a management service for the mobile client;
   monitoring a state of the mobile client for any changes;
   if a change is detected:
      updating the first information stored at the mobile client;
      reporting the updated first information to the management service such that an instruction associated with the change is received from the management service;
      performing a task associated with the received instruction in response to receiving the instruction from the management service;
      reporting completion of the task to the management service; and
      receiving a third information associated with the updated mobile client state that has been validated by the management service, wherein the third information is identical to the updated second information stored at the management service for the mobile client; and
   storing the third information at the mobile client.

2. The method of claim 1, wherein each aspect of the mobile client state is assigned a priority attribute by the management service.

3. The method of claim 2, wherein the instruction includes one from a set of: ignore the change, perform internal correction, and block a mobile client functionality, based on the priority attribute of an aspect of the mobile client state subject to the change.

4. The method of claim 2, wherein the reporting of the updated first information is facilitated by one of: an immediate management session and a management session schedule for a low traffic period, based on the priority attribute of an aspect of the mobile client state subject to the change.

5. The method of claim 1, further comprising:
   structuring each aspect of the mobile client as a node in the mobile client operating system; and
   monitoring each node by a node monitor object for changes, wherein the first information includes a list of nodes by a node identifier and a node version based on a change to the node.

6. The method of claim 1, wherein the first, second, and third information are exchanged during a management session employing a mark-up language protocol such that node structure and node version information is relayed efficiently between the management service and the mobile client.

7. The method of claim 1, wherein a history of updated second information is maintained at the management service in response to multiple changes at the mobile client such that an applicability of a management policy change to the mobile client is determined and a management session initiated for an update to the mobile client state.

8. The method of claim 1, further comprising:
   receiving the first information associated with the mobile client state from the management service during an initial management session.

9. The method of claim 1, wherein the monitoring of changes, updating of the first information, and reporting of the first information is performed by one of: an operating system of the mobile client and a management application controlled by the operating system of the mobile client.

10. The method of claim 9, wherein the first and the third information are stored in a stateful cache layer of the operating system of the mobile client.

11. The method of claim 1, wherein the mobile client is one of a plurality of clients executed by the same mobile device.

12. The method of claim 1, wherein the mobile client is arranged to be executable in a plurality of mobile devices.

13. A mobile device for facilitating communications through a managed network, the mobile comprising:
a memory;
a communication module; and
a processor coupled to the memory and the communication module, the processor configured to execute a client application within an operating system, wherein the client application is configured to perform actions including:
storing a client state in a cache layer, wherein each aspect of the client state is represented as a node and the client state is stored using an identifier and a version for each node;
monitoring changes to the client state by monitoring each node;
in response to detecting a change to an aspect of the client state, updating the stored client state using a corresponding node identifier and node version;
performing one of: ignoring the change, taking corrective action at the mobile device, and reporting the change to a management server through a management session transmitting current client state based on a priority attribute assigned to each aspect of the client state by the management server;
receiving instructions from the management server in response to reporting the current client state;
receiving an updated and validated client state from the management server in response to complying with the received instructions; and
storing the received client state in the cache layer.

14. The mobile device of claim 13, wherein the client application is further capable of:
exchanging client state with the management server during a management session using Extended Mark-up Language (XML) protocol such that a structure and version of nodes corresponding to aspects of the client state are conveyed efficiently; and
providing an invalid initial client state upon first time power-up such that a valid initial client state is received and stored in the cache layer.

15. The mobile device of claim 13, wherein the client application is further capable of one of: initiating an immediate management session and scheduling a management session for a low traffic period to report a change to the client state based on a management server assigned priority attribute of a changed client state aspect.

16. The mobile device of claim 13, wherein the client application is further capable of blocking at least one mobile device functionality based on an instruction received from the management server in response to a reported change that is deemed unauthorized by the management server.

17. The mobile device of claim 13, wherein the client application is further capable of receiving an alert to connect to the management server for an unsolicited client policy and configuration update from the management server in response to a determination by the management server for client state update based on a history of client state updates maintained by the management server.

18. The mobile device of claim 13, wherein the mobile device is one of: a smart phone, a Personal Digital Assistant (PDA), a laptop computer, a handheld computer, and a smart automobile console, and wherein the mobile device is capable of communicating through at least one from a set of: a cellular network, a Voice Over IP (VOIP) network, a Wireless Local Area Network (WLAN), a Wide Area Network (WAN), and a Unified Communications Network (UCN).

19. A system for managing mobile devices capable of communicating over at least one network, the system comprising:
a management server capable of:
storing a state of each managed mobile device in a server cache layer;
receiving a current state of each managed mobile device in response to a change in the mobile device state;
determining an action to be taken in response to the change;
provide instructions for the action to be taken by each affected mobile device; and
in response to receiving a report of completed action to be taken by a mobile device, updating and providing a new state to each affected mobile device;
a mobile device capable of:
storing the state of the mobile device in a mobile device cache layer;
monitoring changes to the state of the mobile device;
in response to detecting a change, reporting the changed state of the mobile device to the management server in a management session;
receiving instructions for the action to be taken in response to the change;
reporting completion of the action to be taken; and
storing a new state of the mobile device in response to receiving the new state from the management server; and
a communications medium comprising at least one from a set of: a cellular network, a VOIP network, a WLAN, a WAN, and a UCN.

20. The system of claim 19, wherein the management server is further capable of:
maintaining a history of state changes to each mobile device;
determining if a management policy change is applicable to a mobile device based on the maintained state history; and
initiating an unsolicited management session to provide the mobile device with an updated state based on the applicable management policy change.

* * * * *